United States Patent [19]

Yamakami et al.

[11] Patent Number: 4,540,424

[45] Date of Patent: Sep. 10, 1985

[54] HEAT-RESISTING ALLOY FOR ROLLS FOR GLASS FORMING

[75] Inventors: Yoshiaki Yamakami, Toyonaka; Arata Yoshimitsu, Katano, both of Japan

[73] Assignee: Kubota, Ltd., Osaka, Japan

[21] Appl. No.: 509,730

[22] Filed: Sep. 30, 1983

Related U.S. Application Data

[63] Continuation of Ser. No. 352,864, Feb. 26, 1983, abandoned.

[51] Int. Cl.$^3$ .............................................. C03B 35/18
[52] U.S. Cl. ....................................... 65/100; 65/101; 65/374.12; 29/132; 75/126 B; 75/126 H; 75/128 G; 75/128 W
[58] Field of Search ................. 29/132; 65/374.12, 90, 65/100, 101; 75/126 B, 126 H, 126 R, 128 G, 128 W

[56] References Cited

U.S. PATENT DOCUMENTS

| 1,762,483 | 6/1930 | Norwood | 75/126 R |
| 2,747,989 | 5/1956 | Kirby et al. | 75/128 G |
| 2,905,577 | 9/1959 | Harris et al. | 148/31 |
| 3,443,922 | 5/1969 | Settino | 65/374.12 X |
| 3,765,858 | 10/1973 | Settino | 29/132 X |

FOREIGN PATENT DOCUMENTS 1241291 8/1971 United Kingdom ............. 75/128 G

*Primary Examiner*—Arthur Kellogg

*Attorney, Agent, or Firm*—Armstrong, Nikaido, Marmelstein & Kubovcik

[57] ABSTRACT

A heat-resisting alloy used for rolls such as glass forming roll, continuous casting roll specifically rolls to be used under severe condition where heating and cooling are repeated containing following components in the following proportions in terms of % by weight:

| C | 0.01–0.20 |
| Si | 0.10–1.5 |
| Mn | 0.10–2.0 |
| Ni | 0.10–6.0 |
| Cr | 14.0–18.0 | as basic components and with at least one of following components contained

| Mo | 0.1–2.0 |
| Nb | 0.05–0.5 |
| V | 0.10–0.5 |
| Co | 0.10–5.0 | and in the case containing Co, $$Ni+Co \leq 7.0$$

the balance being substantially Fe and unavoidable impurities.

4 Claims, 2 Drawing Figures

HEAT-RESISTING ALLOY FOR ROLLS FOR GLASS FORMING

This is a continuation of application Ser. No. 352,864, now abandoned, filed Feb. 26, 1983.

BACKGROUND OF THE INVENTION

Present invention relates to a heat-resisting alloy for rolls, and particularly to glass forming roll, continuous casting roll or such rolls to which severe heating and cooling are repeated.

Plate-like glasses are manufactured by means of a glass forming rolling machine by having molten glass pass the roll continuously. However, the surface of roll is heated to approximately 700° C. by contacting with molten glass of high temperature and is subject to oxidation. The surface of roll is cooled by passing water in the hollow portion of the roll inside to prevent it from high temperature oxidation, however, the portion where molten glass does not contact is cooled with air. Since the roll of a glass forming machine is thus subject to heat impact by heating and cooling, heat cracks are apt to be generated on the roll surface in short time of operation, which obliges replacement of the roll.

In the roll for continuous casting, the roll surface contacts with slab of high temperature and is subject to high temperature oxidation. Heat cracks are also found on the surface of the roll in short period of operation due to repetitions of heating and cooling.

Rolls working in the high temperature have basically same problems, therefore, glass forming roll will be described in detail.

In view of resistance to oxidation and to heat cracks, Cr-Mo steel containing 0.10 to 0.15% (by weight, the same as hereinafter) of C, 1.0 to 2.0% of Cr, 0.10 to 1.5% of Mo, or Ni-Cr steel containing 0.10 to 1.15% of C, 1.0 to 2.0% of Ni, 0.10 to 1.0% of Cr, or ductile cast iron or the like have been used as roll materials for glass forming. Those materials are not sufficient to prevent generation of rough surface and heat cracks on the circumferential face of rolls. Such rough surface or heat cracks generated on the roll surface are transferred to the glass surface in the course of glass forming process, and thus glass of fine surface is not produced with such forming rolls.

SUMMARY OF THE INVENTION

It is an object of this invention to present heat-resisting alloy for rolls capable of retarding generation of cracks caused by thermal impact or oxidation by repetition of heating and cooling.

Another object of this invention is to present a heat-resisting alloy containing following components in the following proportions, in terms of % by weight,

| | |
|---|---|
| C | 0.01–0.20 |
| Si | 0.10–1.5 |
| Mn | 0.10–2.0 |
| Ni | 0.10–6.0 |
| Cr | 14.0–18.0 |

Balance being substantially Fe and unavoidable impurities.

It is still another object of this invention to present a heat-resisting alloy containing the following components in the following proportions in terms of % by weight,

| | |
|---|---|
| C | 0.01–0.20 |
| Si | 0.10–1.5 |
| Mn | 0.10–2.0 |
| Ni | 0.10–6.0 |
| Cr | 14.0–18.0 | one or two still more components selected from following group;

| | |
|---|---|
| Mo | 0.1–2.0 |
| Nb | 0.05–0.5 |
| V | 0.10–0.5 |
| Co | 0.10–5.0 | and when Co is contained, $Ni + Co \leq 7.0$,

Balance being substantially Fe and unavoidable impurities.

DETAILED DESCRIPTION OF THE INCENTION

Figure 1:
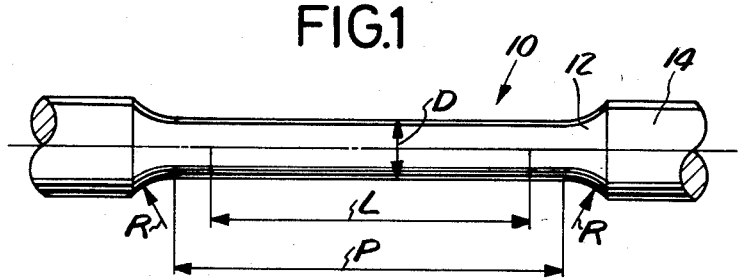
FIG. 1 is a front elevation view of the test piece applied for the yield strength test, the tension test and the elongation test to the alloy of this invention.

The components of the heat-resisting alloy and the proportions of the components will be described in detail.

In the description to follow, the percentages are all by weight.

The content of C should be as low as possible from the viewpoint of toughness, but it is practically difficult to limit lower than 0.01% in ordinary melting. On the other hand, the C content higher than 0.20% reduces toughness enormously. Thus the proper range of C is determined to 0.01 to 0.20%. Higher content of C, however, increases tensile strength of the alloy. Therefore, under conditions in which satisfactory tensile strength and sufficient resistance to heat crack are required, range of the C content is preferred to 0.05 to 0.15%.

Si serves as a deoxidant and is unavoidably contained about 0.10%. However, Si content must be up to 1.5% or lower since an excess of Si leads to reduced toughness resulting in occurrence of crack. Thus the range of Si is 0.10 to 1.5%.

Mn functions also a deoxidant like Si and contributes to strengthening matrix. At least 0.10% of Mn is required for this purpose, but the upper limit of Mn is 2.0% since use of excess amounts of Mn does not bring about corresponding effect and leads to reduced toughness. Thus the range of Mn is 0.10 to 2.0%.

Ni improves resistance to heat crack. At least 0.1% of Ni is used for this purpose, but the upper limit of Ni is 6.0% because use of larger amounts of Ni lowers Al transformation point and leads to impaired resistance to heat crack. Thus the range of Ni is 0.10 to 6.0%.

Cr is effective for preventing formation of coarse face and generation of heat cracks. At least 14.0% of Cr is required for this purpose. However, since the presence of an excess of Cr results in impaired resistance to heat crack, the upper limit of the Cr content is 18.0%. Thus the range of Cr is 14.0 to 18.0%.

Mo contributes to the enhancement of strength at high temperature and to the improvement of resistance to heat crack. At least 0.10% of Mo is used for this purpose. But, its effect is saturated at the content higher than 2.0%. It is not economical to use the expensive Mo excessively. Thus the range of Mo is 0.10 to 2.0%.

Nb and V contribute such as Mo to the improvement of high temperature stength and resistance to heat crack. To achieve these effects sufficiently, it is desired that the Nb content is at least 0.5% and the V content is at least 0.10%. However, excessive use of Nb and V more than 0.5% reduces toughness. Accordingly, the upper limit of Nb and V is preferably 0.5%. Thus the range of Nb is 0.05 to 0.5% and that of V is 0.10 to 0.5%.

Co also contributes to the improvement of high temperature strength and resistance to heat crack, and achieves improvement in toughness at high temperature owing to maintaining a drop of Ms point slightly. For this purpose it is desirable to use at least 0.10% of Co. On the other hand, use of a large amount of Co more than 5.0% does not result in corresponding effects and increases thermal expansion. Also, it is not economical to use the expensive element excessively. Accordingly, the upper limit of the Co content is preferably 5.0%. Thus the range of Co is 0.10 to 5.0%.

While both Ni and Co are important elements for improving resistance to heat crack, heat cracks are likely to occur when the contents of Ni and Co exceed 7.0% in total. Thus the range of Ni and Co is preferably up to 7.0% or lower in total.

Each chemical component in this invention acts not only by its individual effect but also by its mutual additional effect to increase resistance to oxidation and to heat crack of the heat-resisting alloy.

Characteristic feature of the alloy of this invention will be described in detail with reference to examples.

Alloys of various compositions were prepared in an induction melting furnace and made by casting into tubes having a dimension of 160 mm in outside diameter, 28 mm in wall thickness and 220 mm in length. Table 1 shows the chemical compositions of the specimens thus obtained.

Test pieces were prepared from the alloy specimens and tested for heat crack and mechanical properties by the following methods.

Test 1

Heat crack test

The test piece measuring 150 mm in outside diameter, 23 mm in wall thickness and 70 mm in length was presented for heat crack test. The outer surface of the test. The outer surface of the test piece was heated by an induction heating machine (100 KHz), and heating is stopped when the surface temperature reaches 700° C., then the heated surface was cooled in water for 30 seconds. This cycle of heating and cooling in water was repeated until a heat crack was found on the surface of the test piece. Result of the heat crack test is expressed in terms of the number of repetitions.

Result of the test is shown in table 2.

Test 2

Test for Mechanical Properties

Referring to FIG. 1, the test piece 10 was used for the test of 0.2% yield strength, tensile strength and elongation. The test piece 10 comprises a parallel portion L having a circular cross section. The parallel portion L has a fillet 12 measuring R in radius at both ends, and further gripped portions 14, 14 are respectively provided at the termination of the fillets 12, 12. Each letter in FIG. 1 designates following dimension, in which the letter L means a gauge distance.

| L | 50 mm | P | 60 mm |
|---|---|---|---|
| D | 14 mm | R | 15 mm |

By the way, the 0.2% yield strength indicates a stress when 0.2% of permanent elongation occurs in a tension test.

Figure 2:
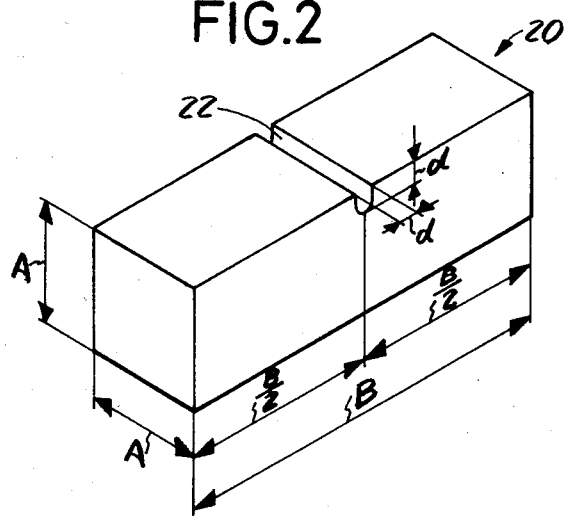
FIG. 2 is a perspective view of the test piece applied for the impact test.

With respect to impact test, it was tested by Charpy Impact Tester with the test piece 20 as shown in FIG. 2. The test piece 20 has a notch portion 22 in which the bottom portion of the groove is formed in 1 mm of radius shape. The test piece 20 was struck from the opposite direction of the notch portion 22. Each letter in FIG. 2 shows as follows:

| A | 10 mm | B | 55 mm |
|---|---|---|---|
| d | 2 mm | | |

The test results of aforementioned mechanical properties are shown in Table 3.

TABLE 1

| Na | C | Si | Mn | Ni | Cr | Mo | Nb | V | Co | Ni + Co |
|---|---|---|---|---|---|---|---|---|---|---|
| Conventional Alloy | | | | | | | | | | |
| 1 | 0.12 | 0.50 | 0.87 | 1.72 | 0.39 | — | — | — | — | — |
| 2 | 0.14 | 0.49 | 0.90 | — | 2.28 | 0.96 | — | — | — | — |
| 3 | 3.00 | 2.15 | 0.95 | — | — | — | — | — | — | — |
| Alloy of the Invention | | | | | | | | | | |
| 4 | 0.12 | 0.29 | 0.91 | 1.21 | 15.10 | — | — | — | — | — |
| 5 | 0.10 | 0.39 | 0.91 | 2.93 | 16.27 | — | — | — | — | — |
| 6 | 0.09 | 0.32 | 0.90 | 1.21 | 16.15 | 1.05 | — | — | — | — |
| 7 | 0.07 | 0.42 | 0.98 | 2.41 | 16.64 | 1.17 | 0.30 | 0.41 | — | — |
| 8 | 0.07 | 0.40 | 0.93 | 2.37 | 16.77 | 0.75 | 0.40 | 0.25 | 3.38 | 5.75 |
| Comparative Alloy | | | | | | | | | | |
| 9 | 0.12 | 0.40 | 0.82 | — | 12.99 | — | — | — | — | — |
| 10 | 0.07 | 0.60 | 1.14 | 8.15 | 18.00 | — | — | — | — | — |

TABLE 1-continued

| Na | C | Si | Mn | Ni | Cr | Mo | Nb | V | Co | Ni + Co |
|---|---|---|---|---|---|---|---|---|---|---|
| 11 | 0.10 | 0.45 | 1.05 | 4.66 | 16.36 | 0.83 | 0.15 | 0.15 | 4.14 | 8.80 |

(Balance substantially Fe)
Note:
The mark (—) means that specific element is not contained particularly.

TABLE 2

| | No. | Number of Repetition |
|---|---|---|
| Conventional Alloy | 1 | 200 |
| | 2 | 290 |
| | 3 | 25 |
| Alloy of the Invention | 4 | 1000 |
| | 5 | 950 |
| | 6 | 1050 |
| | 7 | 1000 |
| | 8 | 1200 |
| Comparative Alloy | 9 | 800* |
| | 10 | 300 |
| | 11 | 700 |

Note (*):
It was difficult to identify the generation of crack due to oxidation at the outer surface.

TABLE 3

| No. | 0.2% Yield Strength (kg/mm$^2$) | Tensile Strength (kg/mm$^2$) | Elongation (%) | Impact Value (kg·m/cm$^2$) |
|---|---|---|---|---|
| Conventional Alloy | | | | |
| 1 | 33.1 | 65.4 | 39.5 | 12.0 |
| 2 | 44.6 | 68.4 | 24.3 | 15.6 |
| 3 | 29.0 | 42.5 | 18.6 | 1.5 |
| Alloy of the Invention | | | | |
| 4 | 63.2 | 80.3 | 23.6 | 14.1 |
| 5 | 67.0 | 90.1 | 18.0 | 12.5 |
| 6 | 63.3 | 80.7 | 23.5 | 14.3 |
| 7 | 72.2 | 90.0 | 21.1 | 10.6 |
| 8 | 76.4 | 96.4 | 23.3 | 8.4 |
| Comparative Alloy | | | | |
| 9 | 53.4 | 70.2 | 25.3 | 10.2 |
| 10 | 25.8 | 58.5 | 60.2 | 15.0 |
| 11 | 77.0 | 101.5 | 20.9 | 8.5 |

Results of the test

Table 2 reveals that the heat-resisting alloys of the invention retard occurrence of heat crack and have superior resistance to heat crack more than 3 times in comparison with the conventional alloys. The comparative alloys are, similar with the conventional alloys, inferior to the alloys of the invention in resistance to heat crack.

Among the specimens listed in Table 2, specimen No. 9 is superior to the conventional alloys in resistance to heat crack, however, it is inferior in resistance to oxidation. Referring to Table 3, the alloys of the invention have exceedingly higher yield strength and tensile strength than the conventional alloys, and further have satisfactory properties in elongation and impact value in comparison with the conventional Ni-Cr steel or Cr-Mo steel in spite of such high strength.

The present alloy is well suited as a material not only for a glass forming roll but also for continuous casting rolls such as support rolls, guide rolls, pinch rolls and so on, specifically under the conditions heating and cooling are repeated.

When a low grade material such as conventional 13Cr steel is used for base material of the roll, weld padding on the circumference of the roll may be applied with the alloys of this invention.

The heat-resisting alloy of this invention has thus high resistance to oxidation and to heat crack even under the environment where heating and cooling are repeated, and in addition, is excellent in mechanical properties such as tensile strength, impact value or the like. Accordingly, the present alloy is suited as a roll material for glass forming machine, continuous casting and so on.

The scope of the invention is not limited to the foregoing description, but various modifications can be made by one skilled in the art without departing from the spirit of the invention. Such modifications are therefore included within the scope of the invention.

What is claimed is:

1. In a process of continuous casting or glass forming operation wherein a material at a high temperature is contacted with the surface of a roller, the surface of the roller being subjected to repetition of heating and cooling and made of a heat-resisting alloy, the improvement wherein the heat-resisting alloy has high resistance to heat cracking under repeated heating and cooling conditions and consists essentially of the following components in the following proportions in terms of % by weight,

| C | 0.01–0.20 |
|---|---|
| Si | 0.10–1.5 |
| Mn | 0.10–2.0 |
| Ni | 0.10–6.0 |
| Cr | 14.0–18.0 | the balance being substantially Fe and unavoidable impurities.

2. A process as defined in claim 1 wherein the alloy contains 0.05 to 0.15% of C.

3. In a process of continuous casting or glass forming operation wherein a material at a high temperature is contacted with the surface of a roller, the surface of the roller being subjected to repetition of heating and cooling and made of a heat-resisting alloy, the improvement wherein the heat-resisting alloy has high resistance to heat cracking under repeated heating and cooling conditions and consists essentially of the following components in the following proportions in terms of % by weight,

| C | 0.01–0.20 |
|---|---|
| Si | 0.10–1.5 |
| Mn | 0.10–2.0 |
| Ni | 0.10–6.0 |
| Cr | 14.0–18.0 | and also contains one or more elements selected from the group consisting of

| Mo | 0.1–2.0 |
|---|---|
| Nb | 0.05–0.5 |

|  |  |
|---|---|
| V | 0.10–0.5 |
| Co | 0.10–5.0 | and in the case containing Co, $Ni+Co \leqq 7.0$ and
the balance being substantially Fe and unavoidable impurities.

4. A process as defined in claim 3 wherein the alloy contains 0.05 to 0.15% of C.

* * * * *

UNITED STATES PATENT AND TRADEMARK OFFICE
CERTIFICATE OF CORRECTION

PATENT NO. : 4,540,424

DATED : September 10, 1985

INVENTOR(S) : YOSHIAKI YAMAKAMI ET AL

It is certified that error appears in the above-identified patent and that said Letters Patent is hereby corrected as shown below:

On the cover page, Item [63], change "Feb. 26, 1983," to --- Feb. 26, 1982, ---.

Signed and Sealed this

Eighteenth Day of February 1986

[SEAL]

Attest:

DONALD J. QUIGG

Attesting Officer

Commissioner of Patents and Trademarks